March 30, 1965 H. P. O. UNGER 3,175,732
DEVICE FOR MEASURING AND DIVIDING OF LIQUIDS
Filed July 25, 1961 3 Sheets-Sheet 1

INVENTOR.
Hans Peter Otto Unger
BY
Attorney

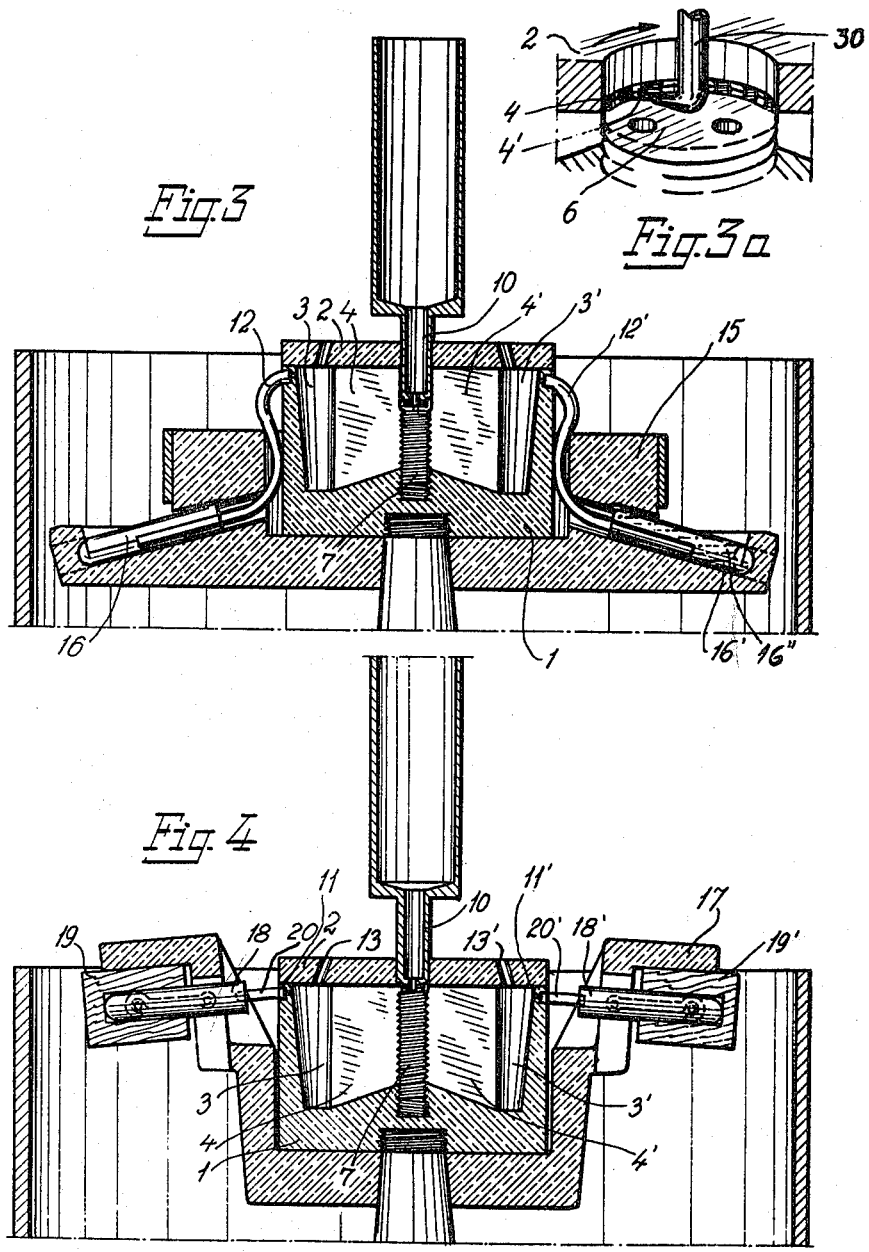

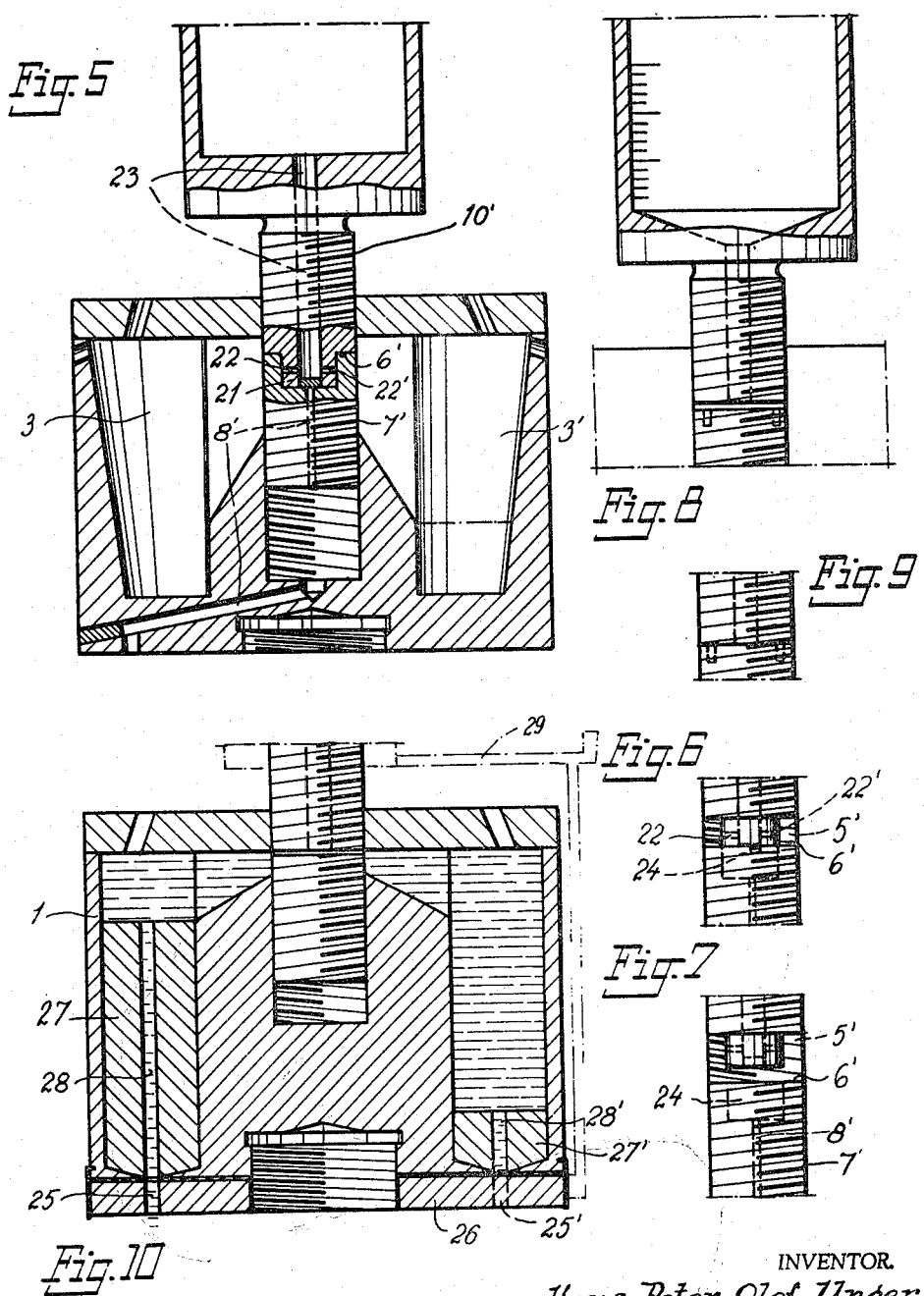

United States Patent Office 3,175,732
Patented Mar. 30, 1965

3,175,732
DEVICE FOR MEASURING AND DIVIDING
OF LIQUIDS
Hans Peter Olof Unger, Halsingehojden 11,
Stockholm, Sweden
Filed July 25, 1961, Ser. No. 130,719
Claims priority, application Sweden, July 28, 1960,
7,302/60
11 Claims. (Cl. 222—134)

The present invention shows a device for measuring of liquids and where necessary, evacuating and for dividing of the measured liquid quantities.

The device for measuring of liquids has many applications of which several are previously known, but the earlier measuring devices to be effective, are of particularly complicated construction, and are therefore very expensive.

The purpose of the present invention was to produce a simply constructed, completely effective measuring and dividing device for large or small liquid volumes, which is of relatively inexpensive construction.

The device for measuring and dividing of liquids according to the invention, primarily is characterized by the fact that it consists of a container in which are arranged a number of peripherally placed compartments which by means of channels, slots or the like are connected to an open-topped central compartment, suitably placed in relation to the peripheral compartments, of which the bottom is placed on a higher level than the bottoms of the peripheral compartments. When liquid is introduced into the central compartment it runs down through the channels or tubes to the peripheral compartments. Upon this happening, the liquid in the peripheral compartments is brought into communication when the liquid surface is level with the bottom of the central compartment so that the liquid surface is always in the same plane in all the peripherally placed compartments, each of which is supplied with an overflow channel for evacuation of the existing contents of measured liquid from the named compartments.

Further, the device is characterized by the fact that the bottom of the central compartment can be installed at different heights so that the liquid in the peripheral compartments can be brought into communication at the same level as the above-named bottom. The device is additionally characterized by the fact that through the bottom of the central compartment there extends a closable emptying channel through which excess liquid present on the bottom is brought to run, so that the liquid surface in the peripheral compartments is always level with the bottom of the central compartment, and the fixed measure of liquid in all the peripheral compartments is automatically maintained.

An embodiment of the device with variations, and examples of the device's applications shall be described in the following, in connection with the drawings.

FIG. 1 shows schematically a perspective, partly in section, of the device, while FIG. 2 shows a vertical section of a portion of the same, on a smaller scale, FIG. 3 shows schematically in vertical section, the device mounted on a centrifuge, where the measured liquid quantities are evacuated to a number of containers. FIG. 3A shows partly in section the central part of the arrangement with angled channels.

FIG. 4 shows schematically in vertical section the device mounted on a centrifuge of another type.

FIG. 5 shows in vertical section the device according to a modified form,

FIG. 6 is a view similar to FIG. 5, of a detail thereof,

FIG. 7 is a view of the detail of FIG. 5 in a different position,

FIG. 8 is a vertical sectional view of a part of another arrangement,

FIG. 9 is a detail of the arrangement of FIG. 8, and

FIG. 10 is a vertical sectional view of another embodiment.

Figure 1:
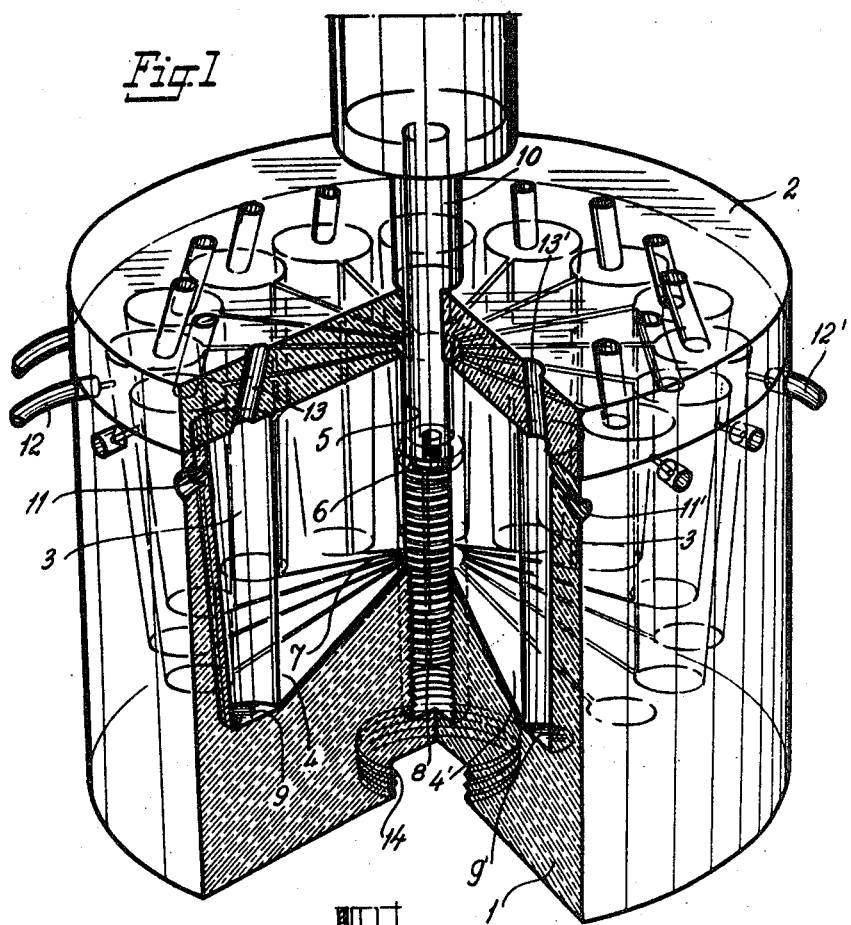
Figure 2:
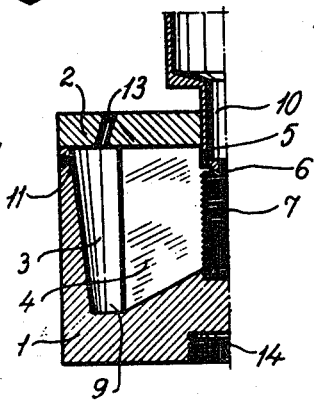

The body of the container is indicated at 1 which suitably can be made of a transparent material, such as that known as "Perspex." On the container's top horizontal plane is fixed a lid 2, suitably of the same material. In the container body 1, which in this case has a circular cross-section, are arranged a number of peripherally placed, primarily vertical compartments 3, 3'. Each of these compartments 3, 3' is by means of a vertically and radially directed slot 4, 4' connected with a centrally situated, opentopped compartment 5 situated in the container body 1 and which compartment 5 is called the central compartment, so that all of the peripheral compartments 3, 3' by means of the slots 4, 4' are connected to the central compartment 5. The central compartment 5 has a bottom 6 controlled by a screw 7 which when turned, displaces the named bottom vertically in the container body, by means of which the bottom of the central compartment 5 can be placed at different levels. The screw 7 has threads which are arranged to screw into the inner vertical sides of the dividing walls between the slots 4, 4' so that the screw 7 then closes off the slots 4,4' from connection with each other, up to the screw's (7) upper end, i.e. the central compartment's bottom 6. The screw can, as is shown in FIG. 1 be supplied with a channel 8 which goes through its length, for emptying excess liquid, which remains at a higher level in the central compartment's (5) bottom. The peripheral compartments 3, 3' have their bottoms 9, 9' arranged at a lower level than the central compartment's bottom 6.

When liquid is poured through the opening to the central compartment 5, the liquid runs down through the slots 4, 4' to the peripheral compartments 3, 3'. When the liquid level is even with the central compartment's bottom 6 the peripheral compartments are exactly filled with the same quantity because the liquid can communicate with the several compartments. If the peripheral compartments are of the same volume, then the peripheral compartments and slots consequently contain exactly the same liquid quantities.

In the central compartment 5 is a capsule-like filling container or inner vessel 10 which can be controlled from above, and whose outer vertical wall shuts off the peripheral compartments from connection with one another. The container's lower end is arranged to close tightly to the central compartment's (5) bottom 6 when the container 10 is in its lowest position, then the whole central compartment 5 is emptied, and the measured liquid quantities are entirely shut off or isolated from each other; on the addition of liquid from the container 10, it is displaced upwards, so that a space forms between its lower end and the central compartment's (5) bottom 6. The container's (10) lower end can be constructed with one another smaller or larger openings, according to the type of liquid to be measured. This named container end can even be supplied with a projection, which fits into, or covers the channel 8, so to permit its closing while liquid is being added.

Since the central compartment's (5) bottom 6 can be installed at variable levels the measured liquid quantities can be exactly regulated in relation to the total amount of introduced liquid. Because of the evacuating channel 8 through the screw 7 it is possible to obtain the required liquid quantities, even if the introduced liquid quantity is bigger than the measured liquid quantities together.

Each of the peripheral compartments 3, 3' is supplied with an evacuating channel 11, 11' for the measured liquid quantities which channels are set either horizontally or angled outwards and end in the container body's periphery. These channels 11, 11' can be in the same plane (as shown in FIG. 1) or in different planes, according to requirements. The ends of these channels are constructed to attach to tubes 12, 12' through which the measured liquid quantities can be led from the container 1 to other containers or the like, situated outside the container 1.

Through the lid 2 in the middle of each peripheral compartment are incorporated holes 13, 13' for the evacuating of air during filling or connections to an air-pressure pump, for the more rapid emptying of the peripheral compartments 3, 3' when, for example, the device is being used stationary (see FIG. 10). These holes could be set obliquely towards the middle of the container. The container body 1 is supplied with a connection for fixing to a centrifuge, and this connection can suitably end in a threaded hole 14 by which the container 1 can be fastened.

If the device is intended for use with a centrifuge, in order to use centrifugal force as a means of evacuating the measured liquid quantities from the peripheral rooms 3, 3' then it is desirable that the walls of the compartments 3, 3' towards the periphery shall be slanted obliquely, in the way shown in several figures of the drawings.

Instead of tubes, the central compartment (5) and the peripheral compartments 3, 3' can be connected to each other by slits. The bottom of the central compartment can even be fixed or be directly formed as a part of the container body 1, and the peripheral compartments 3, 3' bottoms can be constructed on different levels, so that the measured liquid quantities can be of different dimensions in the compartments 3, 3'. Also it is possible to make the bottoms of these compartments movable vertically, similarly to the central compartment's (5) bottom 6. Thus the measured liquid quantities in each compartment can be varied entirely according to requirements.

Evacuating or dividing of the measured liquid quantities can be accomplished in different ways, e.g., by opening and closing devices so constructed that the measured liquid quantities can be run off one by one, or all at the same time, by simultaneous opening and closing of the device.

When simultaneously evacuating or dividing the measured liquid quantities by means of centrifugal force, the device is adapted as a centrifuge head, so that the device works by the rotation of the head (shown in FIGS. 3 and 4).

In the type of centrifuge head 15 which is shown in FIG. 3 a number of detachable containers 16, 16' open at one end are arranged about the periphery of the head 15. The containers 16, 16' are here arranged radially with the openings directed towards the center of the head. The number of containers can suitably tally with the number of peripheral compartments 3, 3' in the device. The compartments 3, 3' are, by means of tubes 12, 12', of suitable length, caliber and peripheral mouth openings, connected to the containers 16, 16' in such a way that the tubes 12, 12', at their free ends, are introduced into the containers 16, 16'. The rotation of the centrifuge head 15 forces the measured liquid quantities into the containers 16, 16'. In this way it is possible entirely automatically to introduce repeatedly exactly equal liquid quantities into all the containers 16, 16' at the same time, which is of particular importance as compared to the time wasting work of manual introduction. In this way the containers 16, 16' can repeatedly be provided with measured liquid amounts of the same or different quantities, and thus, for example, be "washed," or react with the contents of the containers, during centrifugation.

This is so since the new measured liquid quantities, or the continuously running liquid (see FIG. 3A) is deposited entirely according to the tubes' (12, 12') length, in or partly up the container 16, 16', because the mouths of the tubes are a certain distance inside the container (here a centrifuge tube), with the result that the liquid formerly in the container (but not the centrifuged deposit on the container's bottom) is moved towards the container's (here the centrifuge tube's) mouth, and thrown from there by centrifugal force out of the centrifuge head into the centrifuge's surrounding barrier, through the drain of which the old "wash liquid" is collected in a container.

The liquid changing effect can, for example, be further enhanced by—
 (a) A dividing wall 16" running through the container's center, fixed to the inner walls and stretching to the neighborhood of the container's bottom, or
 (b) The tubes 12, 12' themselves taking up a large part of the container's volume, could be placed in the named containers (here the centrifuge tube). Thus when the tube's peripheral mouth is placed in such a way that the tube takes up half of the centrifuge tube, the introduced liquid is pressed through this part. It turns against the bottom of the container thereby running over the centrifuge deposit, and then up the other half of the container, and from there the liquid is thrown in the way mentioned above.

By a suitable shorter peripheral tube length and suitably small mouth openings, and adjusted centrifugal force, a layering of liquids or particle suspensions over or under one another can be obtained. The layering procedure can be adjusted so that the layers remain in the container, or (when layering under one another) so that the different layers successively are pressed towards the container's mouth and are thrown out from there.

The procedures described here are some examples of the functional possibilities of the apparatus shown in the diagrams and described here, which depend on the principles for which patents are here applied for.

With the construction of the device shown in FIG. 3A the central compartment's (5) bottom 6 is projected upwards forming a slot which is limited vertically by the lids 2 lower surface and central compartment's (5) bottom 6. Thus rectangular or square openings are formed to the slits 4, 4'. Into the center of the central compartment 5 is introduced an angled tube, of which the mouth is directed towards the named slits or openings. Besides which the upper end of this tube has a supply tube 30, with an adjustable valve. The supply tube 30 is connected with a reservoir from which a liquid, for example, a particle suspension flows.

During the centrifuge head's, and thus the device's rotation at constant revolutions, the liquid in question is squirted in an even horizontally directed stream, directly into the openings continually into the peripheral compartment 3, 3', and thus across these rooms upper surfaces, i.e., the underneath of the lid 2 and in the described way continues out through the channels 11 and tubes 12 to the containers 16. 16'. The bottom of the central compartment remains in this way free from liquid from the supply tube 30 which is important, since otherwise, an uneven distribution of liquid to the channels can happen.

The liquid can, as mentioned, be a particle suspension, i.e., be mixed with material which has a higher specific gravity than the liquid itself, which causes this material to be enriched i.e., be collected in the container's (16, 16') bottoms, while the liquid runs out of the container's (16, 16') openings, and is thrown from there by centrifugal force out from the centrifuge head into the surrounding barrier from the draw of which the now particle free liquid is collected in a container.

The device, according to the invention, is consequently able to be used as a particle enriching device, which further increases its possibilities.

With the type of centrifuge head 17 shown in FIG. 4, a number of containers are arranged in cassettes 19, 19' which are able to be swung out from the centrifuge head 17, so that the containers 18, 18' by the rotation of the centrifuge head, are primarily horizontally directed towards the head's (17) center, but when the head 17 stops, are directed with the openings upward. On the evacuating tubes 11, 11' are arranged horizontally directed tubes 20, 20' of which the free ends are directed towards the openings 18, 18' of the containers. When these containers are in the horizontal position, i.e. when the head 17 rotates, the introduction of measured liquid quantities in the way described earlier proceeds during the head's (17) rotation, and by centrifugal force equal measured quantities of liquid are forced out through mouths of the tubes 20, 20', to the containers 18, 18'.

The modification of the device shown in FIGS. 5, 6 and 7 has a design of the filler container 10' and the central compartment's (5) bottom 6 where the container 10 and the named bottom 6 are arranged to combine with a valve for regulating the liquid's supply and overflow for automatic quantity control, by the introduction of uncontrolled liquid quantities.

The filling container 10 is here supplied with screw-threads, directed outwards, and which are arranged to fix into threads in the central compartment 5 so that the container 10 is vertically moveable by turning. The lower end of the container is thereupon formed into a plug 21 of which the end is closed. This plug 21 is supplied with horizontally directed channels 22, 22' which are connected to the container's (10') vertically directed liquid channels 23. The central compartment's (5) bottom 6, which in this case finishes in a screw 7 with a contained overflow channel 8', is formed with a cylindrical depression 24', in which the plug 21' fits closely. When the container 10' is entirely screwed down (as in FIG. 5) the liquid's supply to the peripheral compartments 3, 3' and the overflow by the channel 8' is closed.

When the container 10' is screw up about half a revolution (as in FIG. 6) the channels 22, 22' are open for the introduction of liquid to the peripheral compartments 3, 3'. When the container 10 is screwed up a further half revolution (as in FIG. 7) then the overflow channel 8 is open for running off both of the excess added liquid from the filling container, and that liquid in the peripheral compartments which is *over* the central compartment's (5) bottom 6, which in this case is the upper end of the screw 7'.

In FIG. 5 is shown a modification of the device where the bottoms of the peripheral compartments can be arranged at different levels.

The modification of the device shown in FIGS. 8 and 9 show further a form of the filling container, where it is graduated to permit the exact measuring of the total liquid quantity later to be measured and divided. The ventilation system is here of more simple construction, since in this case the running off of the excess liquid does not need to be considered. The ventilation system in the closed position is shown in FIG. 9 i.e. when the total liquid quantity is in the container. FIG. 8 shows the ventilation system in the open position, which is obtained by turning the container 10 about half a revolution, whereupon it is displaced vertically upwards. With the installation shown in FIG. 8, the total liquid quantity in the container can be run down through channel 23 (which in this modification is open at the bottom) and from there in the named way be divided in the peripheral compartments 3, 3'. Otherwise when an exactly measured liquid quantity is put into the device (any of the modifications without the evacuating channel 8, 8' naturally the filling container can be omitted without affecting the device's measuring effect.

The modification of the device shown in FIG. 10 is constructed as a stationary unit, where the evacuating of the measured liquid is accomplished by one or several holes 25, 25' which are placed vertically through the turnable plates 26, situated on the bottom surface of the container. Evacuating of liquid can be accomplished from the peripheral rooms one at a time, if the plate is supplied with one hole 25, or from several, or all at the same time, if the corresponding number of holes 25, 25' are in the plate 26. The plate 26 can of course be fixed in the container, or turntable.

In the same way, the container body 1 in FIG. 10 can be in a fixed position and the rotatable bottom plate 26 can be joined to the container body shown in FIG. 10 by means of a bar 29, placed outside the container body, which in its turn is movable to 3 positions, with the functions: (Pos. 1) closing of the filling container (FIG. 9); (Pos. 2) opening of the filling container (FIG. 8); (Pos. 3) openings of the channels 28, 28' by means of connection with the overflow 25 or the overflow 25. 25' (FIG. 10). The same result can naturally be obtained if the filling container 10, the screw 7 and the channel system 8' (shown in FIGS. 5, 6) are adapted on the container body 1 in FIG. 10, to the named bar and the bottom plate 26. The bars 29 is here turnable to 4 positions with the functions: (Pos. 1) closing the filling container (FIG. 5); (Pos. 2) opening the filling container (FIG. 6); (Pos. 3) opening the overflow channels (FIG. 7); (Pos. 4) opening of all the channels 28, 28', by means of connection with the overflow 25 or the overflows 25, 25' (FIG. 10).

Hereby are postulations given for a remotely controlled, or automatic control of the named functions.

In FIG. 10 is shown that into the peripheral compartments can be lowered exchangeable volume dimishing bodies 27, 27' of different heights, so that the volumes of the compartments and thus the liquid quantities in them can be variably fixed. The volume diminishing bodies 27, 27' are—when they are adapted in container-body 1 of the type shown in FIG. 10—supplied with through channels 28, 28' for the evacuating of the measured liquid quantities.

The invention is not limited to the above described, and in the attached drawings clarified, construction form with modifications, but it can be varied further in a number of ways, within the framework of the invention idea.

I claim:

1. An apparatus for measuring and dividing liquids comprising, a container body having a main chamber around which is arranged a number of individual compartments, each of said compartments being in communication with the main chamber by passageways and each compartment having a draw-off channel, the main chamber being open at the top and having a bottom located in a horizontal plane higher than the bottom ends of the compartments so that liquid introduced into the main chamber will flow into the compartments to the level of the bottom of the chamber, the bottom end of the main chamber being vertically adjustable, so that the liquid level in the compartments can be varied, said bottom consisting of a plug provided in the chamber, which plug is vertically adjustable, the upper end of said plug forming the bottom end of the chamber, said plug being provided with a closable outlet from the bottom end of the chamber, whereby excess liquid from the chamber and compartments can be drained out.

2. An apparatus for measuring and dividing liquids comprising, a container body having a main chamber around which is arranged a number of individual compartments, each of said compartments being in communication with the main chamber by passageways and each compartment having a draw-off channel, the main chamber being open at the top and having a bottom end located in a horizontal plane higher than the bottom ends of the compartments so that liquid introduced into the main chamber will flow into the compartments to the level of the bottom of the chamber, an inlet vessel arranged to fit into the chamber from above, said inlet vessel being axially adjustable therein, said vessel being capable of closing down onto the bottom of the main chamber and being capable of isolating the compartments from one another.

3. Apparatus as claimed in claim 2, wherein the bottom of the inlet vessel and the bottom of the main chamber are constructed with co-operating valve means, and an outlet passageway is provided through the bottom of the main chamber, said outlet passageway being closed when the bottom end of the vessel or tube is moved down onto the bottom of the chamber and being opened when the vessel is raised, said inlet vessel closing the passageways to the compartments, an initial lifting movement of the vessel opening said passageways while maintaining the main chamber outlet closed.

4. Apparatus as claimed in claim 3, wherein the container body is arranged for connection to a centrifuge whereby liquid in the compartments can be extracted through the draw-off channels by centrifugal action.

5. Apparatus as claimed in claim 3, wherein an inlet tube is provided into the main chamber, said tube having its end directed outwards toward the passageways into the compartments.

6. In an apparatus for measuring and dividing liquids comprising, a container body having a main chamber around which is arranged a number of individual compartments, each of said compartments being in communication with the main chamber by passageways and each compartment having a draw-off channel, the main chamber being open at its top and having a bottom end located in a horizontal plane higher than the bottom ends of the compartments so that liquid introduced into the main chamber will flow into the compartments to the level of the bottom of the chamber and the walls of the compartments sloping obliquely outwardly from bottom to top towards the outer surfaces of the compartments, so that the cross section of each compartment increases progressively from bottom to top.

7. An apparatus for measuring and dividing liquids comprising, a container body having a main chamber around which is arranged a number of individual compartments, each of said compartments being in communication with the main chamber by passageways and each compartment having a draw-off channel, the main chamber being open at the top and having a bottom end located in a horizontal plane higher than the bottom ends of the compartments so that liquid introduced into the main chamber will flow into the compartments to the level of the bottom of the chamber, the draw-off channels being located near the tops of the compartments, extending from the outer surface of the container body.

8. An apparatus for measuring and dividing liquids comprising, a container body having a main chamber around which is arranged a number of individual compartments, each of said compartments being in communication with the main chamber by passageways and each compartment having a draw-off channel, the main chamber being open at its top and having a bottom end located in a horizontal plane higher than the bottom ends of the compartments so that liquid introduced into the main chamber will flow into the compartments to the level of the bottom of the chamber, bodies fitting into the compartments, said bodies occupying part of the capacity of the compartments, the bottom wall of each compartment being adjustable vertically, whereby the capacity of the compartments can be varied individually.

9. An apparatus for measuring and dividing liquids comprising, a container body having a main chamber around which is arranged a number of individual compartments, each of said compartments being in communication with the main chamber by passageways and each compartment having a draw-off channel, the main chamber being open at its top and having a bottom end located in a horizontal plane higher than the bottom ends of the compartments so that liquid introduced into the main chamber will flow into the compartments to the level of the bottom of the chamber, a bottom plate provided for the container body, said plate having one or more outlets for the compartments, said compartments having co-operating outlets at their bottom ends, said plate being turnable in relation to the body, so that said outlets can be opened or closed according to the position of the plate.

10. Apparatus as claimed in claim 9, wherein the bottom plate is coupled to the container body so that said plate and container body can be moved together to provide control of the inlet to the main chamber and compartments and the outlet from the compartments.

11. An apparatus for measuring and dividing liquids comprising, a container body having a main chamber around which is arranged a number of individual compartments, each of said compartments being in communication with the main chamber by passageways and each compartment having a draw-off channel, the main chamber being open at its top and having a bottom end located in a horizontal plane higher than the bottom ends of the compartments so that liquid introduced into the main chamber will flow into the compartments to the level of the bottom of the chamber, the upper part of the container body consisting of a lid having open outlets from each compartment, said outlets being directed diagonally towards the center of the container body.

References Cited by the Examiner
UNITED STATES PATENTS 2,819,739  1/58  Ehrlich et al. _____ 222—482 X
2,865,614  12/58  Nogy _____ 222—144.5

RAPHAEL M. LUPO, *Primary Examiner.*
LAVERNE D. GEIGER, *Examiner.*